Patented Oct. 31, 1939

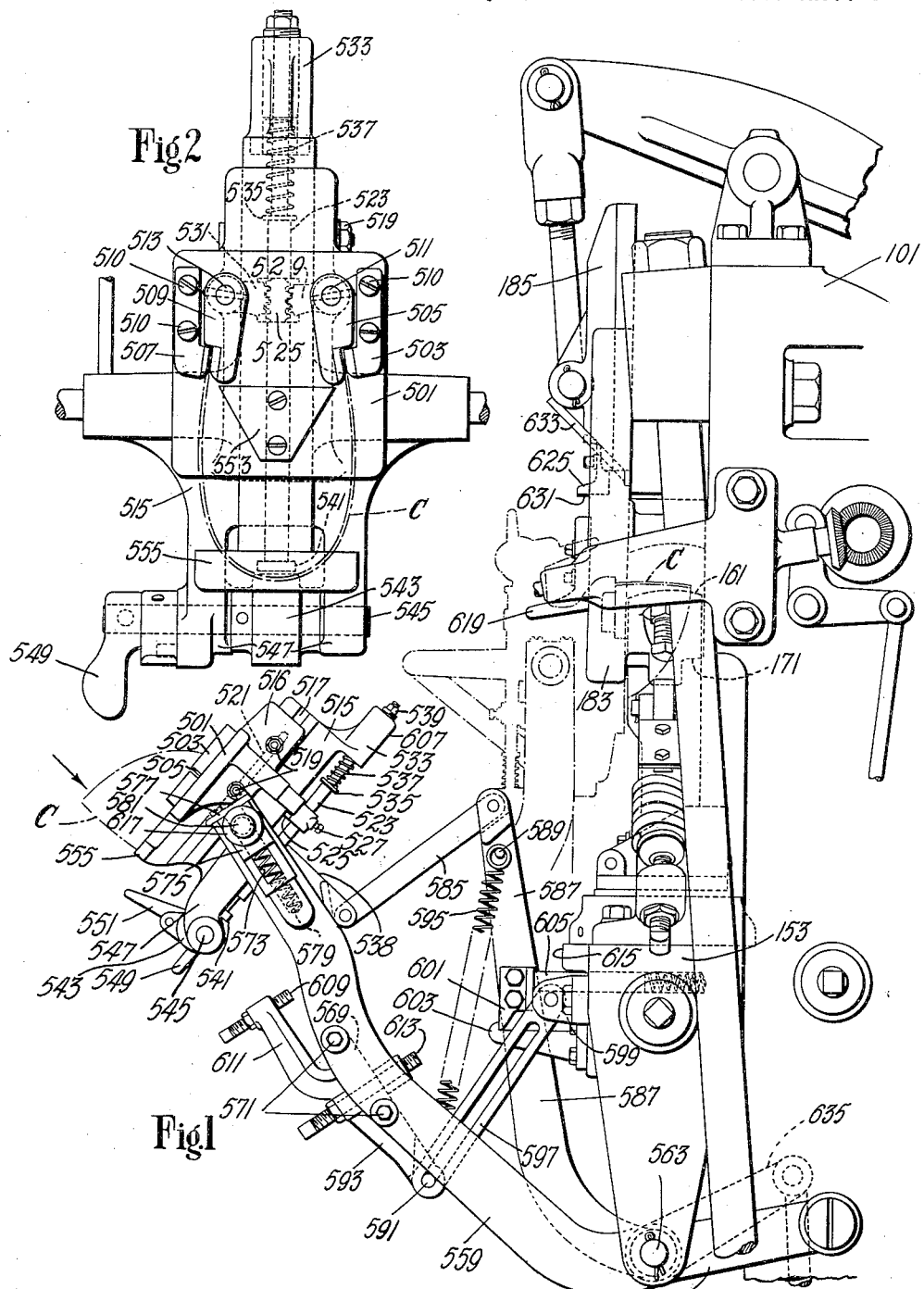

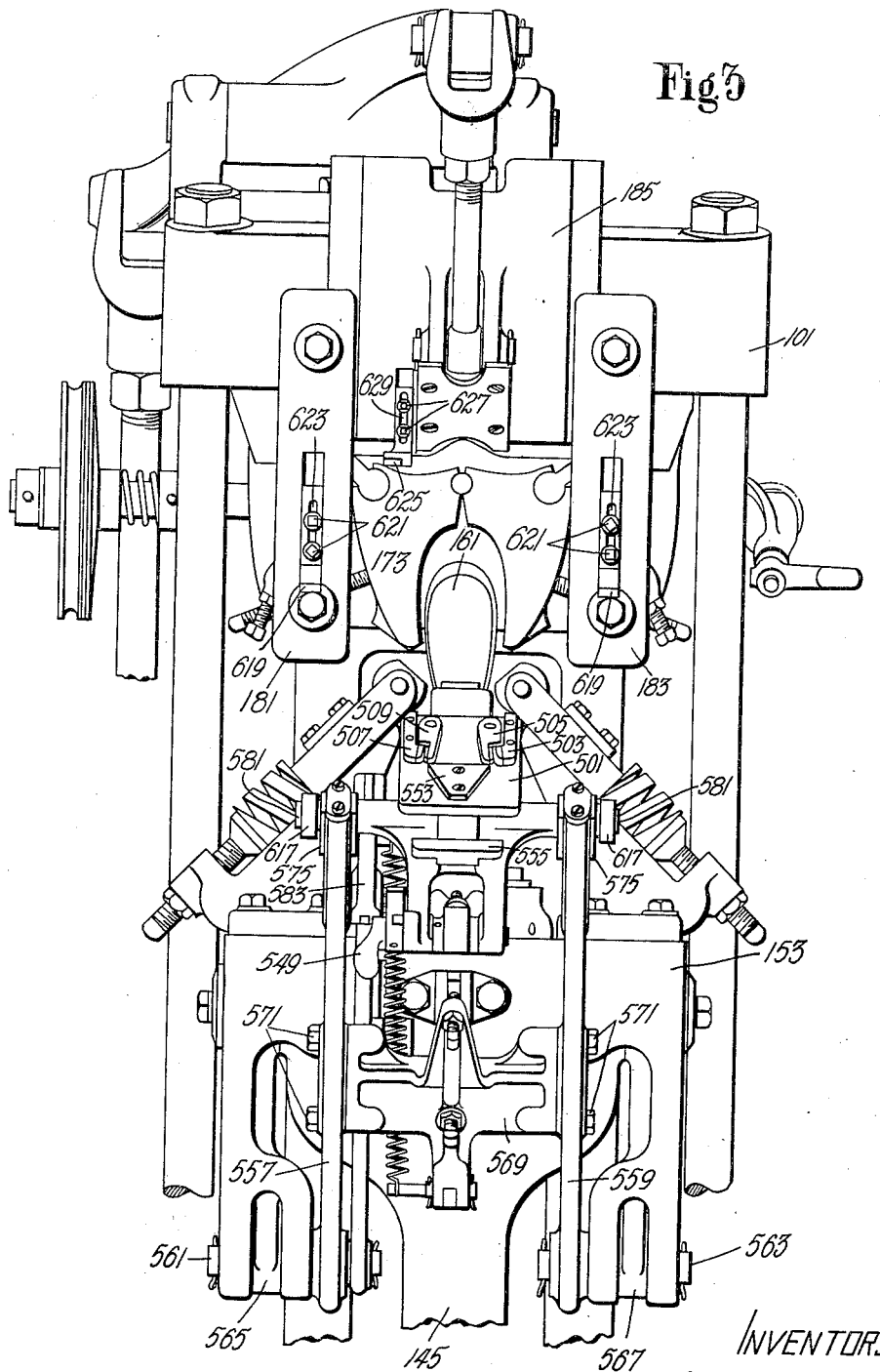

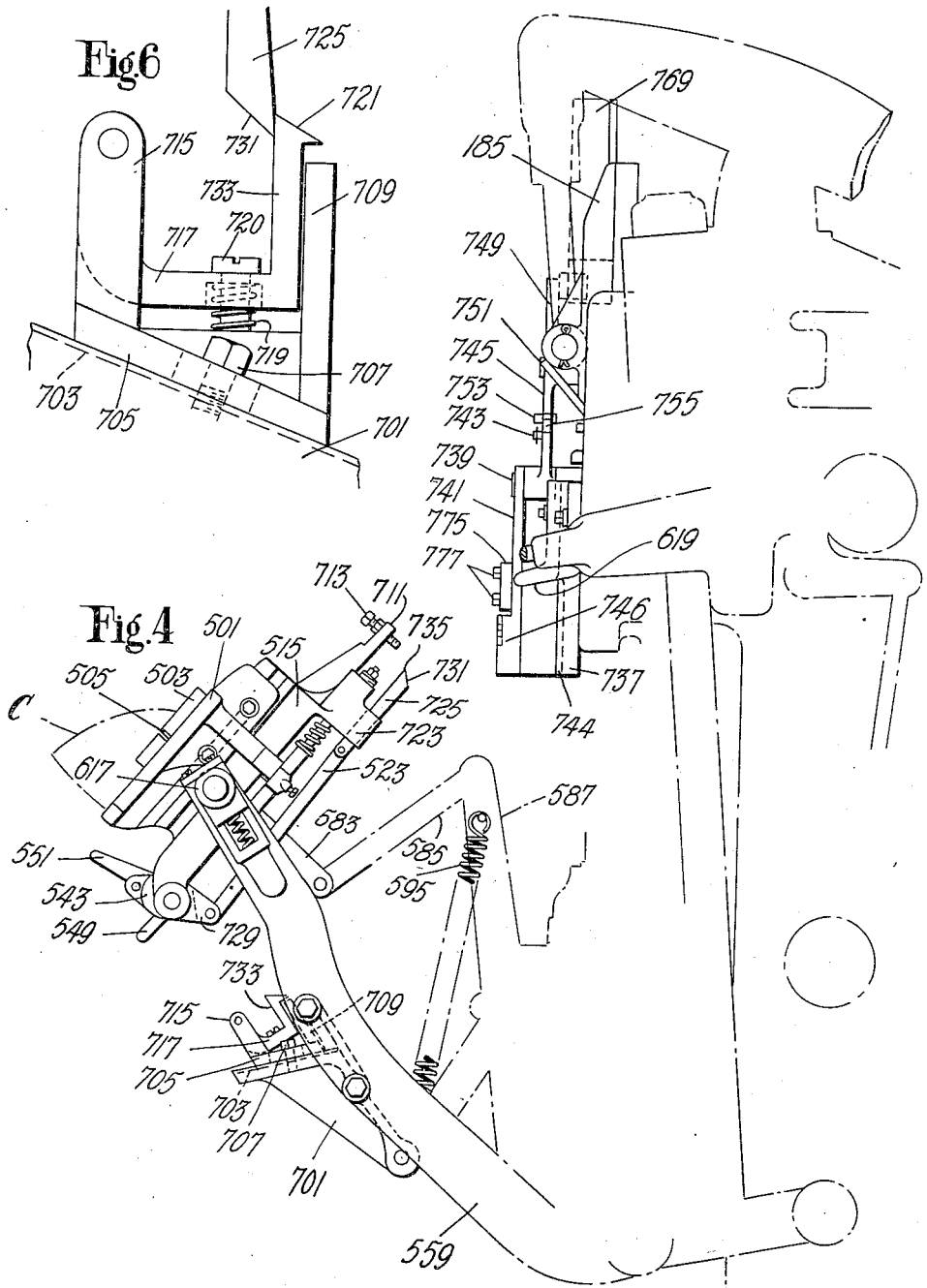

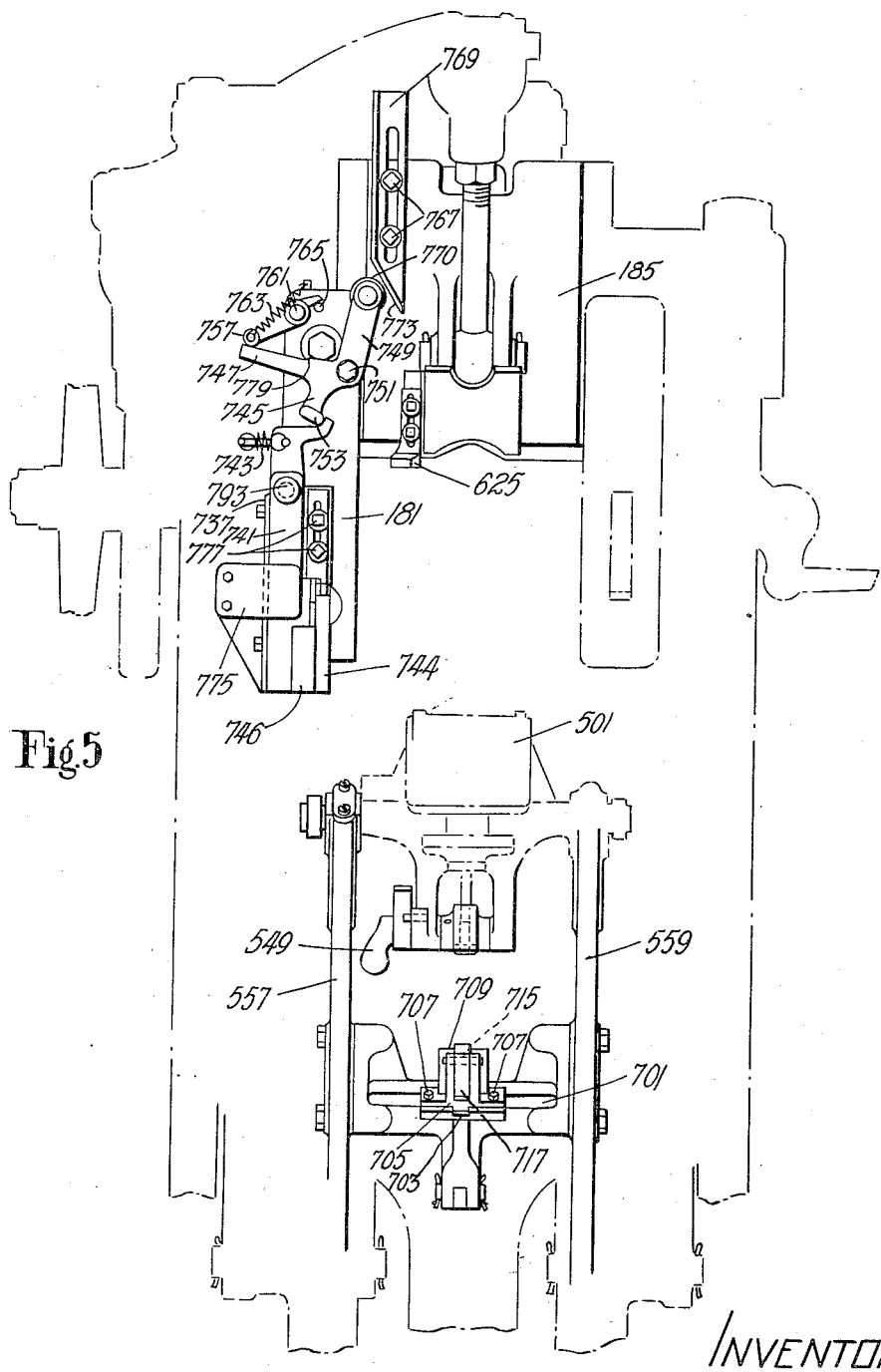

2,178,133

UNITED STATES PATENT OFFICE 2,178,133

COUNTER MOLDING MACHINE

Leslie Hugh Bennion and Arthur Alan Rivington, Leicester, England, assignors to United Shoe Machinery Corporation, Borough of Flemington, N. J., a corporation of New Jersey Application May 4, 1938, Serial No. 206,032 In Great Britain May 21, 1937

15 Claims. (Cl. 12—66)

This invention relates to machines for shaping blanks such as shoe part blanks and is herein illustrated as embodied in a counter molding machine of the type illustrated in United States Letters Patent No. 1,742,300, granted January 7, 1930, upon an application filed in the name of L. H. Bennion.

It is an object of the invention to provide in a machine of the type referred to improved mechanism for presenting blanks to molds for shaping the blanks. Preferably and as shown, the mechanism comprises a blank presenting device which is movable from a loading station into operative relation relatively to the molds of the machine for presenting a blank thereto, there being means for controlling the position of the device in its extreme positions and for locating it at the loading station in position to facilitate the insertion of a blank in the device as well as means for retaining the device, at the proper time, in operative relation to the molds during the shaping operation.

These and other features of the invention are disclosed in the following specification, and in the accompanying drawings, and are pointed out in the claims.

In the drawings:

Fig. 1 is a view in side elevation of a counter molding machine embodying one form of our presenting device;

Fig. 2 is a view on an enlarged scale showing parts of the presenting device as seen looking in the direction of the arrow in Fig. 1;

Fig. 3 is a front elevation of the head portion of the machine shown in Fig. 1;

Fig. 4 is a view in side elevation of a portion of a counter molding machine embodying an alternative form of our blank presenting device;

Fig. 5 is a front elevation of the machine shown in Fig. 4; and

Fig. 6 is a side view on an enlarged scale of latch mechanism shown in Fig. 4.

As shown in Figs. 1 and 3 of the drawings, the invention is applied to a counter molding machine the principal operating parts of which correspond to those illustrated in the aforementioned United States Letters Patent. This machine comprises a frame 101 carrying a support in the form of a table 153 which has an upward and downward movement imparted to it by a rocking lever 145. The table carries a male mold 161 which is cooperable with a two part female mold 171, 173 which is arranged to close about the male mold to grip and press the sides of a counter blank to give it the desired rounded shape.

On the front of the machine are carried guides 181, 183 between which is mounted a former 185 movable in a heightwise direction across the face of the male mold to form a flange on a counter blank positioned thereon. The construction thus far described is well-known in the art and need not be described in detail.

One form of counter presenting device constituting the subject-matter of our invention will now be described. This device, which is shown in Figs. 1, 2 and 3, comprises a table 501 having positioned thereon two sets of clamping jaws 503, 505, and 507, 509. The jaws 503 and 507 are fixedly secured by screws 510, Fig. 3, to the surface of the table 501 and the jaws 505 and 509 are secured to the ends of rods 511 and 513 which are mounted for angular movement openings in the table 501.

The table 501 is supported upon a block 515, Fig. 1, by means of arm portions 516 which engage opposite sides of the block and have tongues which enter the guideways, one of which is shown at 517 in Fig. 1. The table is normally held in fixed position on the block by means of bolts 519 which pass through a slot 521 in the block. This construction provides for adjustment of the table along the guideways. The table carries a rod 523 which is mounted for axial movement and which carries a double rack 525 adjustably mounted thereon and arranged to be held in adjusted position by the screw 527. Oppositely disposed teeth of the rack are arranged to mesh with teeth formed on the ends of arms 529 and 531 secured to the lower ends of the rods 511 and 513, respectively. One end portion of the rod 523 passes through a bore in the sleeve member 533. Threaded in the block 515 and located between the sleeve member 533 and a washer 535 there is a compression spring 537. The outer end of the sleeve member 533 is provided with a hexagon head 539 to facilitate rotation of the member to adjust the compression of the spring 537. As shown in Fig. 2, the pairs of jaws 503, 505 and 507, 509 are arranged to grip the end portions of a counter blank C indicated by dot and dash lines, the jaws being maintained in gripping relation by the action of the spring 537. The lower end of the rod 523 is provided with a head 541 which in the position shown in Fig. 2 is spaced by a slight distance from a cam member 543 carried by a shaft 545 pivotally mounted in ears 547 projecting from the block 515. The shaft 545 carries two arms 549 and 551 the functions of which will later be set forth.

When the presenting device is in its loading position the shaft 545 occupies such an angular position that a high portion of the cam member 543 engages the head 541 and maintains the rod 523 in its upper position with the result that the clamping jaws are held in open position. In locating a counter blank in the presenting device the operator bends it into a U-shape and inserts its end portions between the clamping jaws, after which he presses the arm 549 downwardly, thereby rotating the shaft 545 in a counterclockwise direction (Fig. 1), thus causing the high portion of the cam member 543 to move away from the head 541 permitting the rod 523 under the action of the spring 537 to cause the blank to be gripped between the clamping jaws. As will be hereinafter described, when the presenting device is in position to deliver a blank to the molds of the machine the arm 551 is engaged by moving part of the machine to cause the shaft 535 to turn in a clockwise direction thereby causing the clamping jaws to open and release the blank from the presenting device.

In order to guide the counter blank in positioning its ends between the clamping jaws there is provided a plate 553 secured to the upper surface of the table 501 and having beveled side surfaces which direct the ends of the blank toward the jaws. The table 501 supports the end portion of the blank but the curved heel-end portion thereof is supported by a portion 555 of the block 515 having a flat surface located in the plane of the surface of the table 501 and against which the end of the counter blank rests.

The block 515 is mounted upon two spaced parallel arms 557 and 559 which are pivoted at their lower ends on studs 561 and 563 respectively which are located in a depending portion of the table 153. These studs are pivotally connected to the frame of the machine by arms 565 and 567 which are connected together by a plate 569 secured to the arms by screws 571. At the upper end of each arm is a slot 573 in which is slidably mounted a block 575 retained in its slot by a cap plate 577 against which it is held by a compression spring 579. Each block 575 has a trunnion 581 projecting inwardly therefrom and being received in coaxial bores at opposite sides of the block 515.

An angular position of the block 515 with respect to the arms 557 and 559 is controlled by the following mechanism. The block 515 has a depending arm 583 having a link 585 pivoted thereto. The other end of the link 585 is pivotally secured to the upper end of an arm 587 which in turn is pivoted on the stud 561. The arm 587 and the arms 557 and 559 are normally forced toward each other by a spring 595 connecting a pin 589 on the arm 587 and a pin 591 on a lug 593 on the plate 569. The lug has secured to it an end portion of a link 597 which has a slot 598 through which the pin 591 passes, one end of the link being pivoted to a bracket 599 secured to the table member 153. The link 597 limits the extent to which the presenting device may swing away from the molds of the machine and thus determines the loading position of the device. In order to limit the movement of the arm 587 in a direction away from the machine frame the arm is provided with a catch piece 601 which is adapted to be engaged by a hook member 603 secured to the table member 153. Bearing against the catch piece 601 is a spring pressed plunger 605 carried by the table member and arranged to exert pressure upon the arm 587 to tend to force it in a direction outwardly of the frame.

When the presenting device is in its loading position and a counter blank C has been inserted between the clamping jaws and gripped therebetween, the arms 557 and 559 are swung in a clockwise direction (Fig. 1) about the studs 561 and 563 to carry the blank toward the molds of the machine. On the first portion of the movement the catch piece 601 will be held against the hook member 603 by the action of the spring 595 and the plunger 605. In this connection it is to be noted that the spring 595 serves to relieve to some extent the force necessary to move the presenting device toward the molds. Since the arm 587 is held stationary while the arms 557 and 559 are moving the link 585 presses upon the arm 583 to effect a turning movement of the block 515 and the table 501 about the axis of the trunnions 581 in a clockwise direction. The arrangement is such that when the presenting device is at the loading station the surface of the table 501 is disposed toward the operator, that is, at an angle of about 40° to the vertical which has been found to be a desirable angle to enable the operator conveniently to insert a blank in the device. As the presenting device is moved toward the mold it turns relatively toward the arms 557 and 559 through an angle of about 110° until a surface 607 on the block 515 engages an adjustable stop screw 609 threaded in a lug 611 projecting upwardly from the plate 569. The arrangement of parts is such that this engagement of the stop screw will take place before the arms 557 and 559 have moved to the full extent toward the machine frame, that is, before the presenting device has actually reached operative position in front of the molds. The stop screw 609 prevents further rotation of the block 515 relatively to the arms 557 and 559 in consequence of which, upon further movement of the arms toward the machine frame, the arm 587 is caused to swing with them. Thus when the presenting device is about to reach its limit of forward movement which is indicated in dot and dash lines in Fig. 1 the counter blank has imparted to it only a swinging movement about the axis of the studs 561, 563. The radius of this swinging movement is much greater than the radius of the movement about the trunnions 581 and, consequently, the counter blank is carried over the male mold 161 in a movement which is along a flat arc. This feature is one which we have found to make it possible to present a blank to the molds in a much more satisfactory manner than would be the case if the blank were swung about a short radius as it was carried between the molds.

The movement of the blank presenting device in carrying the blank over the male mold 161 is limited by a stop screw 613 threaded in the plate 569 and arranged to engage a surface 615 on a table member 153. The operative position of the presenting device relatively to the molds can be adjusted by altering the setting of the stop screw 613 thus to insure that the counter blank is correctly located over the male mold. It is to be noted that the presentation of the blank to the male mold is normally unaffected by the vertical movement of the male mold which may be taking place during the movement of the presenting device owing to the rocking of the lever 145 by reason of the fact that the arms 557 and 559 swing about the studs 561 and 563 which also move heightwise in fixed relation to the male mold due to the action of the rocking lever 145.

Because of the convex shape of the upper surface of the male mold 161 it has been found desirable to arrest movement of the presenting device during the final part of the upward movement of the male mold. The effect of this is to cause the upper surface of the male mold to press upwardly into the blank held by the presenting device and thus to cause the blank to be stretched slightly over the mold at about the time the blank is being gripped between the male mold and the two part female mold 171, 173. This tends to avoid any tendency of creasing or wrinkling the blank at the time the female mold commences to grip the blank. To this end we have provided rolls 617 mounted upon the trunnions 581 and operable when the presenting device is close to the molds and moving upwardly to contact with stop brackets 619 which are secured by screws 621 to the flange former guides 181 and 183. The screws 621 pass through slots 623 in the brackets thus to provide for vertical adjustment of the brackets. When the rolls 617 engage the stop brackets 619 the vertical movement of the table 501 and block 515 is arrested and the small blocks 575 move in the slots 573 against the action of the springs 579 with the result that as the male mold moves upwardly the outer upper portions of the counter blank are stretched over the mold.

During the operation of the molds the presenting device is held in position adjacent to the molds until the latter have been effective to grip the blank between them, after which the presenting device is returned to loading position by swinging it in a counterclockwise direction (Fig. 1) until the pin 591 engages the forward end of the slot in the link 597.

To effect release of the clamping jaws 503, 505 and 507, 509 when the blank is gripped between the molds in order to permit movement of the presenting device away from the molds there is provided a small bracket 625 which is secured to the front face of the flange former 185 by screws 627 which pass through a slot 629 to permit adjustment of the bracket vertically with respect to the flange former. The bracket 625 has a surface 631 positioned at a lower level than the operative edge of the flange former and adapted to engage the arm 551 on the shaft 545 to rotate the shaft and thereby to cause the clamping jaws to be opened in the manner above described.

Any suitable and convenient means may be used for causing swinging movements of the arms 557, 559 to carry the presenting device to and fro between loading and presenting stations. For example, as indicated in Fig. 1, one of the arms may have an extension 635 connected to a treadle or a hand lever which the operator may actuate to cause movement of the device.

Whatever means is adapted for effecting movement of the presenting device it is to be appreciated that the device should be moved away from the molds before the flange former 185 descends in front of the molds to prevent damaging the presenting device by the flange former. To insure this, the flange former is provided with an inclined plate 633 which, in the event that the presenting device has not been moved away from the molds, will engage the portion 555 on the block 515 and act as a cam to move the presenting device out of the path of the flange former.

Figs. 4, 5 and 6 illustrate a counter molding machine corresponding to that illustrated in Figs. 1, 2 and 3 but provided with a modified form of presenting device. The same reference characters are used in these figures to indicate various parts previously described in connection with Figs. 1, 2 and 3. In this form, the stop screw 609 is dispensed with and in place of the plate 569 there is provided a plate 701 connected to the arms 557, 559 and which has a guideway 703 formed upon its upper surface. A bracket 705 is adjustably secured in the guideway by screws 707. The bracket 705 has a lug 709 projecting upwardly therefrom which is arranged to engage a stop screw 711 threaded in a lug 713 in the block 515 to limit swinging movement of the block with respect to the arms 557 and 559. The bracket 705 has an extension 715 upon which is pivoted a U-shaped arm 717 the base portion of which is normally urged by a spring 719 in a counterclockwise direction (Figs. 4 and 6) against the head of a screw 720 threaded into the bracket 705. The link of the U-shaped arm 717 remote from its pivot has a beveled surface 721 formed thereon. The block 515 has a lug 723 in which there is slidably mounted a latch piece 725 one end of which is pivoted to an end of a link 727, the other end of the link being pivoted to a lug 729 joined to the cam member 543. This arrangement is such that when the rod 523 is displaced downwardly to cause the clamping jaws 503, 505 and 507, 509 to grip a blank the lug 729 is moved to cause the end of the latch piece 725 to project further beyond the lug 723. When the blank is moved toward the molds and the block 515 swings relatively to the arms 557, 559, the inclined end surface 731 of the latch piece 725 travels over the inclined surface 721 of the U-shaped arm 717 and just before the stop screw 713 engages the lug 709 the latch piece 725 latches against a surface 733 of the member 717. When this occurs the block 515 can no longer swing in either direction with respect to the arms 557, 559. Thus at the time the blank is introduced between the molds and the molds close upon it its correct presentation cannot be disturbed by the block 515 turning in a counterclockwise direction.

After the blank has been operated upon it is released by engagement of the bracket 625 with the arm 551 as heretofore described. At this time the lug 729 is moved to draw the latch piece 725 above the surface 733, thereby releasing the block 515 for counterclockwise movement. The movement imparted by the lug 729 to the latch piece 725 is sufficient to cause release of the latch piece despite the raising of the surface 733 relatively to the latch piece which will occur at the last stage of the presenting operation.

When it is desired to vary the position at which the movement of the block 515 in a clockwise direction is stopped the position of the member 705 in the guideway 703 is adjusted. To insure accurate locating of the position of the block 515 with respect to the arms 557 and 559, the separation between the end of the stop screw 713 and the edge 735 of the latch piece should be such that when the stop screw 713 engages the lug 709 there is as little play as possible between the edge 735 and the surface 733. Adjustment of the setting of member 705 in the guideway 703 may make it necessary to make a small consequential adjustment of the stop screw 713 to insure that the latch piece will always operate with a minimum amount of play.

We have provided mechanism to prevent possible inaccurate presentation of a blank due to rebound of the presenting device when it is first brought up to the molds. To this end the flange former guide at the left-hand side of the machine has a plate 737 which supports a horizontal stud 739 on which is pivoted a lever 741 normally retained in the position shown in Fig. 5 by a tension spring 743. The right-hand surface of the lower portion of the lever 741 forms the forward wall of a recess, the rear wall of which is formed by an abutment plate 744 secured to the plate 739, the recess being of such width that it is adapted snugly to receive within it the roll 617 at the left-hand side of the blank presenting device. As the blank presenting device approaches the molds the rolls 617 contact the lower portion of the lever 741 upon an inclined surface 746 and cams this portion of the lever to the left until the roll 617 is allowed to enter the recess whereupon the lower portion of the lever snaps to the right under action of the spring 743 causing the roll 617 to be embraced in the recess and locked therein against swinging movement in either direction.

To provide for release of the arms 557, 559 after the blank has been operated upon by the molds we have provided a lever having three arms 745, 747, 749, and which is mounted upon a fixed pivot 751. The arm 745 has at its end a lug 753 which, upon rotation of the lever, may bear against a projection 755 at the upper end of the lever 741. The arm 747 is arranged to be engaged by a roll 757 on a lever 759 mounted upon the fixed pivot 761, the lever being urged in a clockwise direction (Fig. 5) by a spring 763 which tends to maintain a part of it in contact with a fixed pin 765. Adjustably secured by screws 767 is a bar 769 which has an inclined surface 773 which is arranged to engage a roll 770 mounted on the arm 749 to cause rotation of the lever 744, thus swinging the lever 741 in a clockwise direction causing its lower portion to move to the left to remove the roll 770 from the recess and permitting the blank presenting device to be moved away from the molds before the flange former descends upon it.

The lever 741 is restrained against movement outwardly by a plate 775, fixedly secured to the plate 737 by screws 777, and arranged to engage the forward surface of the lower part of the lever 741.

It may occasionally be desired to render the lever 741 ineffective. To do this the lever 759 is turned in a counterclockwise direction until the roll 757 engages a surface 779 on the cam 727. During this movement of the lever 759 the spring 753 will be carried over the center of the pivot 761 and will thus serve to retain the lever 759 in its new position and consequently the lever 741 will be held in position out of the path of the roll 617 with the result that the roll will not be locked in the recess as above described.

In the operation of the machine illustrated in Figs. 1, 2 and 3, the counter blank is positioned on the table 501 of the presenting device which is assumed at the time to be in the position shown in Fig. 1 with the table tilted toward the operator. The counter is bent in the form of a U and pressed down upon the table with the ends of the counter forced between the jaws 503, 505, and 507, 509 which at this time are in open position, and handle 549 is rotated to cause the jaws to grip the counter and hold it in position. The arm 635 is then depressed by means of a treadle to rotate the arms 557, 559 in a clockwise direction (Fig. 1) to move the presenting device with the counter therein toward the male mold 161. As the presenting device is moved toward the mold, the links 585 and 587 cause the rotation of the device relatively to the arms 557, 559 until movement is arrested by engagement of the surface 607 with the stop 609 in which position the counter will be carried with its upstanding wall substantially normal to the axes of the arms. The arms 557, 559 continue to move angularly until arrested by the engagement of the stop 613 with the surface 615 on the support 153. During the angular movement of the presenting device toward the male mold, the latter is moved upwardly toward the female mold 171, 173 by operation of the rocking lever 145. At the end of the angular movement of the presenting device, the counter C has been brought over the upper surface of the male mold 161 and shortly afterward the stop 619 engages the rolls 617 carried by the presenting device to arrest its further upward movement. The male mold then engages the rear portion of the counter which is stretched smoothly over the mold as the latter rises and cooperates with the female molds 171, 173 to shape the counter. After the shaping operation the flange former 185 commences to move across the faces of the molds and the stop 625 thereon operates to engage the lever 551 causing the latter to release the clamping jaws 503, 505, and 507, 509 and the plate 633 carried by the flange former engages a portion of the presenting device to move it away from the molds out of the path of the flange former. Subsequently to this the flange former 187 completes its movement across the faces of the molds to form the flange of the counter. Upon the release of the treadle, the presenting device will return to its original position with the table 501 rotated into position to receive another fresh counter.

The operation of the modified machine illustrated in Figs. 4, 5, and 6 is similar to the operation above set forth except that as the presenting device is rotated about its trunnions 581, the device is locked in position along the axes of the arms 557, 559 by a member 731 which engages a latch 733, and when the presenting device approaches the molds, the trunnions are engaged by a cam 746 and locked against movement laterally or outwardly by a lever 741 which is later released by a cam 773 operating through a lever 745 just prior to the flange forming operation.

Having thus described our invention, what we claim as new and desire to secure by Letters Patent of the United States is:

1. A machine for molding shoe parts comprising a frame, molds carried by the frame, a pair of arms pivotally mounted upon the frame and having trunnions at their outer ends, a blank presenting device mounted upon the trunnions, means for moving the presenting device angularly relatively to the frame from a blank receiving position into position to present a blank to the molds, and means for rotating the presenting device about the trunnions during movement of the presenting device toward the molds.

2. A machine for molding shoe parts comprising a frame, molds mounted in the frame for shaping a shoe part blank, a plurality of arms pivotally mounted upon the frame, a blank presenting device carried by the arms for movement therewith toward or away from the molds, means for pivotally mounting the presenting device on the arms, and means for rotating the presenting device on the arms as the device is moved toward or away from the molds.

3. A machine for molding shoe parts comprising a frame, shoe part shaping molds carried by the frame, a pair of arms pivotally mounted upon the frame, a blank presenting device mounted upon the arms for angular movement relatively thereto and for movement along the arms, means for moving the presenting device toward or away from the molds, means carried by the arms for limiting angular movement of the presenting device relatively thereto, and means for limiting movement of the presenting device relatively to the molds.

4. A machine for operating shoe parts, a frame, a female mold carried by the frame, a support movable heightwise of the frame, a male mold carried by the support arranged for cooperation with the female mold to shape blanks, a plurality of arms pivotally mounted upon the support, a blank presenting device carried upon the ends of the arms, means for mounting the presenting device upon the arms comprising blocks resiliently mounted in slots in the ends of the arms, and trunnions carried by the blocks for supporting the presenting device, means for moving the presenting device toward or away from the molds, means for rotating the presenting device upon the trunnions as the device is moved toward the molds, means for moving the support, the male mold and the presenting device in a heightwise direction, and a stop for limiting heightwise movement of the presenting device.

5. A counter molding machine comprising a frame, counter shaping molds carried by the frame, a counter blank presenting device mounted for angular movement from a blank receiving position into position in which a blank is presented to the molds, a flange former movable across the faces of the molds to form a flange on a counter blank positioned between the molds, and means carried by the flange former operable during movement thereof to engage the counter blank presenting device to force the latter away from the molds.

6. A counter molding machine, a frame, counter shaping molds carried by the frame, a counter blank presenting device comprising a table, a plurality of clamping jaws fixedly secured to the table, a plurality of movable jaws cooperable with the fixed jaws to clamp a counter blank in position upon the table, toothed arms carried by the movable jaws, a plunger carried by the block, a rack carried by the plunger and making engagement with the toothed arms, a spring normally operative to move the plunger in the direction to cause clamping of the jaws, a cam for moving the plunger in a direction to cause release of the jaws, a pair of arms pivotally mounted upon the frame and secured to the presenting device at their outer ends, means for moving the presenting device on the arms toward and away from the molds, and means carried by the frame of the machine for operating the cam to cause release of the clamping jaws.

7. A machine for operating upon shoe parts comprising a frame, molds carried by the frame, a blank presenting device pivotally mounted for movement relatively to the frame from a blank receiving station into position for presenting a blank to the molds, blank gripping means carried by the device, a lever for operating the blank gripping means, a flange former movable across the faces of the molds to form a flange on a blank positioned between the molds, and a member carried by the flange former for engaging the lever to release the blank gripping means prior to operation of the flange former upon the blank.

8. A machine for operating upon shoe parts comprising a frame, a female mold mounted upon the frame, a support mounted for movement heightwise of the female mold, a male mold carried by the support for cooperation with the female mold to shape a blank, a blank presenting device pivotally mounted upon the support for movement toward or away from the male mold, and means for arresting heightwise movement of the presenting device prior to an operation of the molds in shaping the blank.

9. A machine for operating upon shoe parts comprising a frame, a support mounted for reciprocation heightwise of the frame, a male mold mounted upon the support, a blank presenting device, means for mounting the device on the support for angular movement relatively to the mold and for movement heightwise thereof, and means carried by the frame of the machine for arresting heightwise movement of the presenting device.

10. A counter molding machine comprising a frame, counter shaping molds mounted in the frame, a counter blank presenting device, means for mounting the counter blank presenting device for movement heightwise of the frame and angularly relatively thereto to present a counter blank in operative relation to the molds, means for moving one of the molds heightwise of the frame to engage a counter blank positioned on the presenting device, and means for arresting movement of the presenting device heightwise of the frame prior to operation of the molds in shaping the counter blank.

11. A counter molding machine comprising a frame, a female mold carried by the frame, a male mold movable heightwise of the female mold in shaping a counter blank, a counter blank presenting device mounted for movement angularly of the male mold from a blank receiving position into position to present a counter blank to the male mold, means for mounting the presenting device for movement with the male mold during part of the heightwise movement thereof, counter blank gripping jaws carried by the presenting device, a lever for operating the jaws, means for arresting heightwise movement of the presenting device, and means carried by a moving part of the machine for causing the lever to operate the jaws to release the counter blank after heightwise movement of the presenting device has been arrested.

12. A counter molding machine comprising a frame, a plurality of counter shaping molds carried by the frame, a plurality of arms pivotally mounted upon a portion of the machine and having at their free ends a plurality of trunnions, a counter blank presenting device mounted upon the trunnions, means for moving the arms to cause the presenting device to move into the proximity of the molds, means to rotate the presenting device on the trunnions to present a counter blank carried thereby to the molds, latch mechanism for holding the presenting device in predetermined angular position relatively to the arms, means for locking the presenting device in operative relation to the molds, and means operable at a predetermined point in the cycle of operations of the machine for rendering the locking device inoperative.

13. A machine for operating upon shoe parts comprising a frame, molds carried by the frame, a blank presenting device mounted for movement toward and away from the molds and having a table and blank gripping means carried by the table, a support for the presenting device mounted for movement angularly of the frame, means for pivotally mounting the table on the support, and means for moving the table angularly relatively to the support as the device is moved toward or away from the molds.

14. A machine for operating upon shoe parts comprising a frame, molds carried by the frame, a blank presenting device mounted for movement toward and away from the molds and having a table and blank gripping means carried by the table, a support for the presenting device mounted for movement angularly of the frame, means for pivotally mounting the table on the support, means for moving the table angularly relatively to the support, and a latch for securing the table in predetermined angular relation to the support during a portion of the movement of the device toward the molds.

15. A machine for operating upon shoe parts comprising a frame, molds carried by the frame, a blank presenting device mounted for movement toward or away from the molds, a support for the presenting device mounted for movement angularly of the frame, means for pivotally mounting the device on the support, means for moving the device angularly relatively to the support as the device is moved toward the molds, a latch for securing the device in predetermined angular relation to the support during a portion of the movement of the device toward the molds, and means carried by a moving part of the machine for releasing the latch.

LESLIE HUGH BENNION.
ARTHUR ALAN RIVINGTON.

CERTIFICATE OF CORRECTION.

Patent No. 2,178,133. October 31, 1939.

LESLIE HUGH BENNION, ET AL.

It is hereby certified that error appears in the printed specification of the above numbered patent requiring correction as follows: Page 1, second column, line 17, before the word "openings" insert --in--; page 5, first column, line 10, claim 4, before "shoe" insert —upon—; and that the said Letters Patent should be read with this correction therein that the same may conform to the record of the case in the Patent Office.

Signed and sealed this 2nd day of July, A. D. 1940.

(Seal)
Henry Van Arsdale,
Acting Commissioner of Patents.